(12) United States Patent
Yoneda et al.

(10) Patent No.: US 8,042,400 B2
(45) Date of Patent: *Oct. 25, 2011

(54) PRESSURE SENSOR

(75) Inventors: Masayuki Yoneda, Tokyo (JP); Tomohisa Tokuda, Tokyo (JP)

(73) Assignee: Yamatake Corporation, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 12/574,261

(22) Filed: Oct. 6, 2009

(65) Prior Publication Data

US 2010/0083766 A1 Apr. 8, 2010

(30) Foreign Application Priority Data

Oct. 7, 2008 (JP) .................................. 2008-260955

(51) Int. Cl.
  *G01L 13/02* (2006.01)
(52) U.S. Cl. ............................................ 73/716; 73/736
(58) Field of Classification Search ........................ None
  See application file for complete search history.

(56) References Cited

U.S. PATENT DOCUMENTS

| | | | | |
|---|---|---|---|---|
| 4,530,244 | A * | 7/1985 | Starr | 73/727 |
| 5,259,248 | A | 11/1993 | Ugai et al. | |
| 5,291,788 | A * | 3/1994 | Oohata et al. | 73/727 |
| 5,412,992 | A * | 5/1995 | Tobita et al. | 73/721 |
| 5,677,493 | A * | 10/1997 | Yamamoto et al. | 73/727 |
| 2010/0083765 | A1* | 4/2010 | Yoneda et al. | 73/721 |

FOREIGN PATENT DOCUMENTS

| | | |
|---|---|---|
| CN | 1055060 A | 10/1991 |
| JP | 05-072069 A | 3/1993 |
| JP | 5-196525 A | 8/1993 |
| JP | 6-102128 A | 4/1994 |
| JP | 06-213746 A | 8/1994 |
| JP | 7-113707 A | 5/1995 |
| JP | 8-240494 A | 9/1996 |
| JP | 09-304206 A | 11/1997 |
| JP | 3359493 B | 11/1997 |
| JP | 2002-277337 A | 9/2002 |

OTHER PUBLICATIONS

Z. Xiuwen, et al., Development of Polysilicon Pressure Sensor with High Performance, Journal of Transcluction Technology, 1993.

* cited by examiner

*Primary Examiner* — Andre Allen
(74) *Attorney, Agent, or Firm* — McDermott Will & Emery LLP (57) ABSTRACT

A pressure sensor according to the present invention comprises: a differential pressure diaphragm, which is provided to a center part of a sensor chip; a differential pressure gauge, which is provided to a perimeter edge part of the differential pressure diaphragm and is formed in radial directions; a differential pressure gauge, which is disposed at a position at which it opposes the differential pressure gauge and, together with the first differential pressure gauge, sandwiches the differential pressure diaphragm and is formed in perimeter directions, which are perpendicular to the radial directions; a differential pressure gauge, which is provided in the vicinity of the differential pressure gauge and is provided in the perimeter directions; a differential pressure gauge, which is disposed at a position at which it opposes the differential pressure gauge and, together with the differential pressure gauge, sandwiches the differential pressure diaphragm and is formed in the radial directions; a static pressure diaphragm, which is disposed at a position that lies in the perimeter directions between the differential pressure gauge and the differential pressure gauge; and a static pressure diaphragm, which is disposed at a position at which it opposes the static pressure diaphragm and, together with the static pressure diaphragm, sandwiches the differential pressure diaphragm.

5 Claims, 9 Drawing Sheets

PRESSURE SENSOR

CROSS REFERENCE TO PRIOR APPLICATIONS

The present application claims priority under U.S.C. §119 to Japanese Patent Application No. 2008-260955, filed Oct. 7, 2008. The content of the application is incorporated herein by reference in its entirety.

FIELD OF THE INVENTION

The present invention relates to a pressure sensor and more particularly relates to a pressure sensor that has a diaphragm.

BACKGROUND OF THE INVENTION

Because pressure sensors that take advantage of a semiconductor's piezoresistive effect are compact, lightweight, and highly sensitive, they are widely used in the fields of industrial measurement, medical care, and the like. In such pressure sensors, a diaphragm is formed on a semiconductor substrate. Furthermore, a strain gauge is formed on the diaphragm. When pressure is applied to the diaphragm, the strain gauge deforms. The piezoresistive effect allows any change in the resistance of the strain gauge to be detected, and thereby the pressure is measured.

A monolithic pressure sensor that provides a differential pressure diaphragm and a static pressure diaphragm on the same substrate has been disclosed (refer to Japanese Unexamined Patent Application Publication No. H5-72069 ("JP '069")). In this disclosure, strain dividers are formed between differential pressure strain gauges and static pressure strain gauges. Forming these strain dividers ensures that, when static pressure is applied, the stress generated by the static pressure diaphragm spreads to and affects the differential pressure diaphragm, which prevents the applied pressure from affecting the differential pressure measurement value. For example, when a differential pressure is applied, the change in the differential pressure diaphragm generates excess stress on the sensor chip. This stress affects the static pressure gauges. In addition, when static pressure is applied, the change in the static pressure diaphragm generates excess stress on the sensor chip. This stress affects the differential pressure gauges. The strain dividers mitigate these impacts.

In addition, a pressure sensor of another configuration has been disclosed (refer to Japanese Patent No. 3359493 ("JP '493")). This pressure sensor adopts a structure wherein appropriate nonbonded regions are provided at the corners of the surface of the sensor chip to which a pedestal is bonded. Specifically, a differential pressure diaphragm is formed in a center part of the sensor chip, and nonbonded regions are formed in the corner parts of the sensor chip. Thereby, temperature-induced zero shift and the attendant dispersion is minimized, which makes it possible to provide satisfactory temperature characteristics.

Nevertheless, in JP '069, if the sensor chip is made compact, then sufficient space for providing the strain dividers must still be secured, which is a problem. Namely, the strain dividers themselves increase the size of the sensor chip. In addition, if the configuration recited in JP '493 is adapted to the monolithic pressure sensor, then securing spaces to form the nonbonded regions in the corner parts of the sensor chip becomes difficult.

Thus, it is difficult to implement a compact, high performance pressure sensor, which is a problem.

The present invention was conceived to solve the aforementioned problems; it is an object of the present invention to provide a compact, high performance pressure sensor.

SUMMARY OF THE INVENTION

A pressure sensor according to an aspect of the invention is a pressure sensor that includes: a substrate; a differential pressure diaphragm, which is provided to a center part of the substrate; a first differential pressure gauge, which is provided to a perimeter edge part of the differential pressure diaphragm and is formed in radial directions with respect to the center of the differential pressure diaphragm; a second differential pressure gauge, which is disposed at a position at which it opposes the first differential pressure gauge and, together with the first differential pressure gauge, sandwiches the differential pressure diaphragm and is formed in a perimeter edge part of the differential pressure diaphragm in perimeter directions, which are perpendicular to the radial directions; a third differential pressure gauge, which is provided to the perimeter edge part of the differential pressure diaphragm in the vicinity of the first differential pressure gauge and is provided in the perimeter directions; a fourth differential pressure gauge, which is disposed at a position at which it opposes the third differential pressure gauge and, together with the third differential pressure gauge, sandwiches the differential pressure diaphragm and is formed in the radial directions in the perimeter edge part of the differential pressure diaphragm; a first static pressure diaphragm, which is provided on an outer side of the differential pressure diaphragm and is disposed at a position that lies in the perimeter directions between the third differential pressure gauge and the fourth differential pressure gauge; and a second static pressure diaphragm, which is provided on an outer side of the differential pressure diaphragm and is disposed at a position at which it opposes the first static pressure diaphragm and, together with the first static pressure diaphragm, sandwiches the differential pressure diaphragm. Thereby, it is possible to prevent crosstalk owing to interference between the static pressure and the differential pressure. Thereby, it is possible to implement a compact, high performance pressure sensor.

A pressure sensor according to an aspect of the invention is the abovementioned pressure sensor, which further includes: a pedestal, which is bonded to the substrate; wherein, nonbonded regions, wherein the pedestal and the substrate are not bonded, are provided on the outer sides of the opposing two sides of the differential pressure diaphragm at which the differential pressure gauges of the differential pressure diaphragm are formed. Thereby, it is possible to improve the temperature characteristics. Thereby, it is possible to implement a compact pressure sensor with even higher performance.

A pressure sensor according to another aspect of the invention is the abovementioned pressure sensor, wherein the first and second static pressure diaphragms have shapes such that the edges disposed in the radial directions are shorter than the edges disposed in the perimeter directions; and the static pressure gauges formed such that they oppose and sandwich the differential pressure diaphragm are provided to the center parts of the first and second static pressure diaphragms and the end parts of the first and second static pressure diaphragms that are disposed in the perimeter directions. Thereby, it is possible to improve the temperature characteristics. Thereby, it is possible to implement a compact pressure sensor with even higher performance.

A pressure sensor according to a further aspect of the invention is the abovementioned pressure sensor, wherein the first and second static pressure diaphragms are formed as oblongs. Thereby, the pressure sensor can be fabricated more conveniently.

A pressure sensor according to an aspect of the invention is the abovementioned pressure sensor, wherein the first and second static pressure diaphragms are square; and the static pressure gauges, which are formed such that they line up with the directions in which each of the static pressure diaphragms are arrayed, are provided to two adjacent end parts of the first and second static pressure diaphragms. Thereby, it is possible to improve the temperature characteristics. Thereby, it is possible to implement a compact pressure sensor with even higher performance.

The present invention provides a compact, high performance pressure sensor.

DETAILED DESCRIPTION OF THE INVENTION

Figure 1:
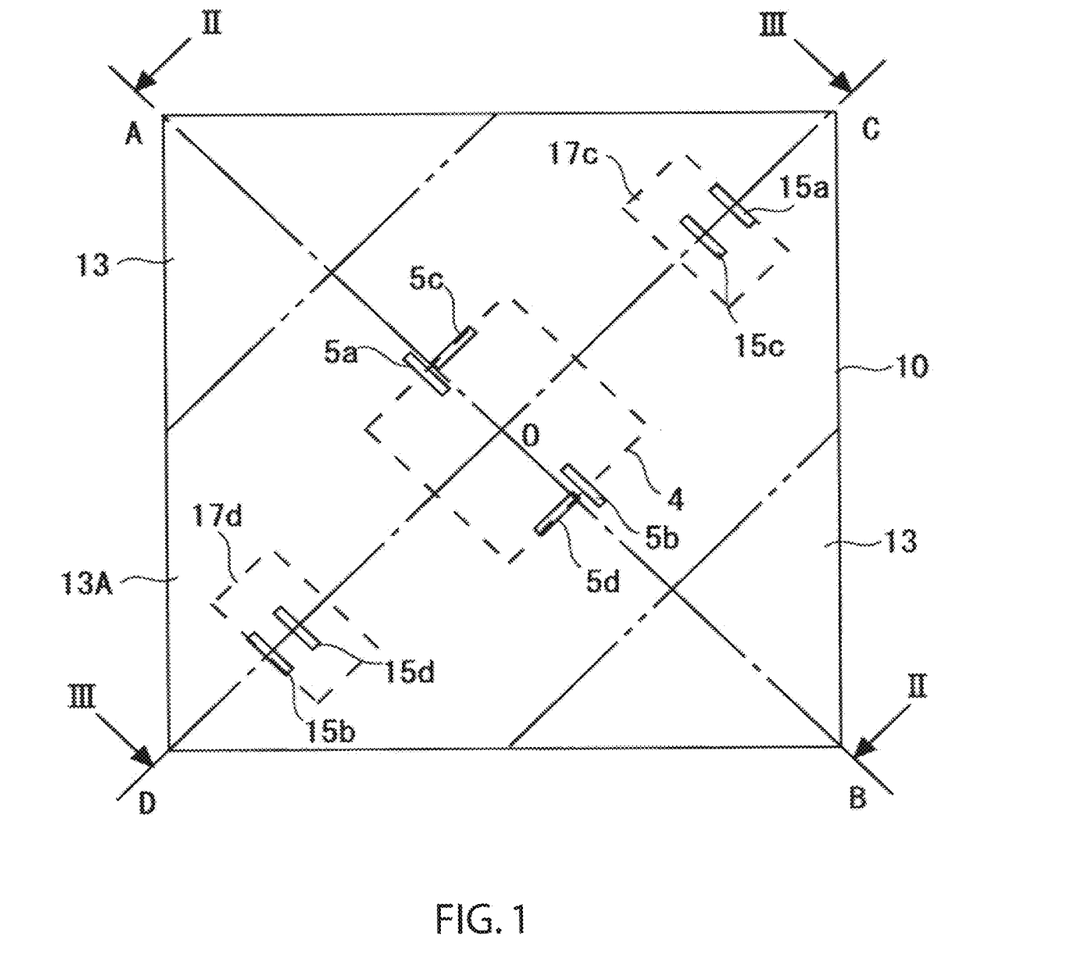
FIG. 1 is a top view that shows the configuration of a pressure sensor according to an embodiment of the present invention.
Figure 2:
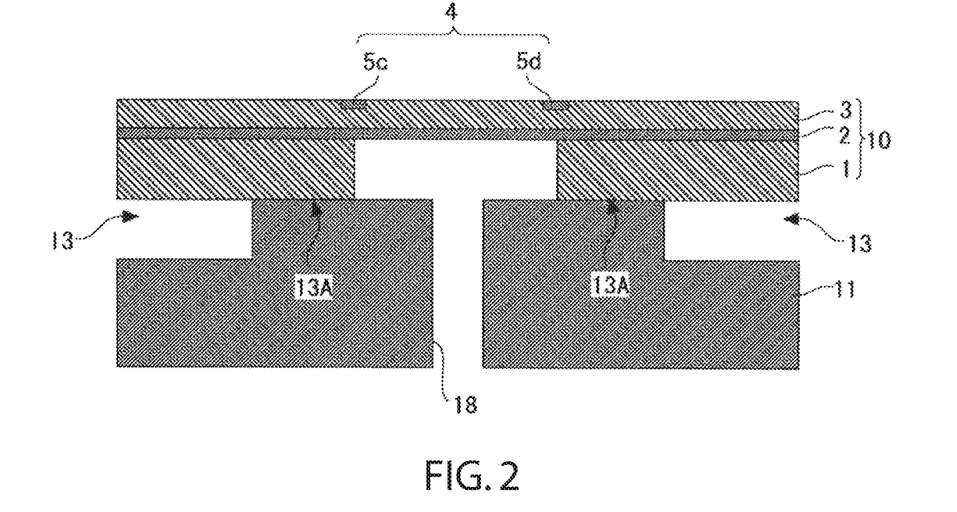
FIG. 2 is a cross sectional view taken along the II-II line in FIG. 1.
Figure 3:
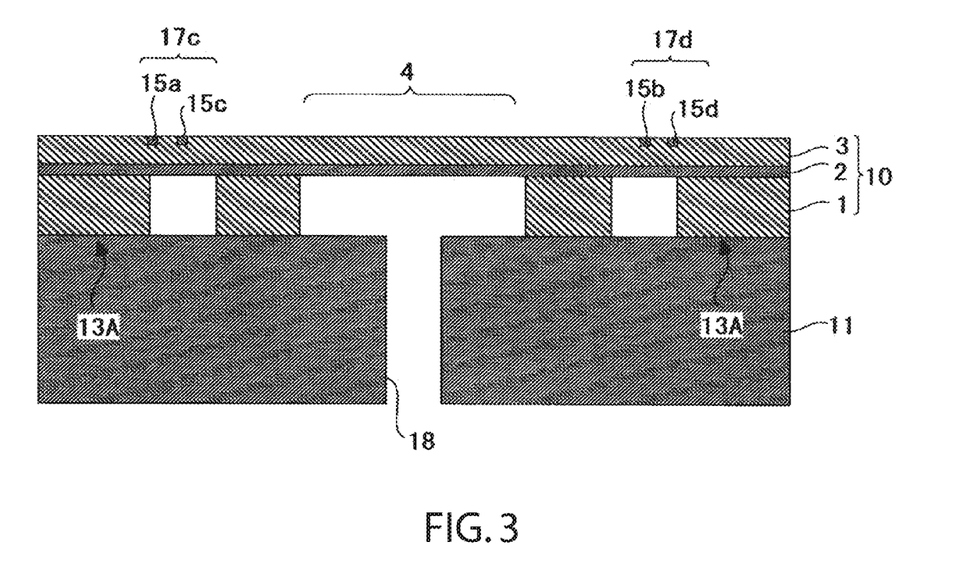
FIG. 3 is a cross sectional view taken along the III-III line in FIG. 1.

The following text explains in detail specific embodiments wherein the present invention is adapted, referencing the drawings. FIG. 1 is a top view that shows the configuration of a sensor chip used in a pressure sensor according to the present embodiment. FIG. 2 is a cross sectional view taken along the II-II line of FIG. 1, and FIG. 3 is a cross sectional view taken along the III-III line of FIG. 1. The pressure sensor according to the present embodiment is a semiconductor pressure sensor that takes advantage of the piezoresistive effect of semiconductors.

The pressure sensor comprises a sensor chip 10, which is a semiconductor substrate. The sensor chip 10 has a square shape. As shown in FIG. 1, the vertices of the square sensor chip 10 are designated as A, B, C, D. As shown in FIG. 1, the upper left corner is designated as corner A, the lower right corner is designated as corner B, the upper right corner is designated as corner C, and the lower left corner is designated as corner D. The diagonal line that connects the corner A and the corner B is designated as diagonal line AB. The diagonal line that connects the corner C and the corner D is designated as diagonal line CD. Because the sensor chip 10 has a square shape, the diagonal line AB and the diagonal line CD are orthogonal. Furthermore, the center of the sensor chip 10 is designated as a center O. The center O coincides with the intersection point between the diagonal line AB and the diagonal line CD.

As shown in FIG. 2, the sensor chip 10 has a three-layer structure that includes a first semiconductor layer 1, which constitutes a base, an insulation layer 2, and a second semiconductor layer 3. For example, a silicon-on-insulator (SOI) substrate that comprises the first semiconductor layer 1, the insulation layer 2, which has a thickness of approximately 0.5 µm, and the second semiconductor layer 3 can be used as the sensor chip 10. The first semiconductor layer 1 and the second semiconductor layer 3 each has, for example, an n-type monocrystalline silicon layer. The insulation layer 2 comprises, for example, an $SiO_2$ layer. The insulation layer 2 is formed on the first semiconductor layer 1. In addition, the second semiconductor layer 3 is formed on the insulation layer 2. Accordingly, the insulation layer 2 is disposed between the first semiconductor layer 1 and the second semiconductor layer 3. When the first semiconductor layer 1 is etched, the insulation layer 2 functions as an etching stop. The second semiconductor layer 3 comprises a differential pressure diaphragm 4. As shown in FIG. 2, the differential pressure diaphragm 4 is provided to and disposed at a center portion of the sensor chip 10.

The differential pressure diaphragm 4 for detecting differential pressure is provided at the center part of the sensor chip 10. As shown in FIG. 2, the differential pressure diaphragm 4 is formed by eliminating the first semiconductor layer 1. Namely, the formation of the differential pressure diaphragm 4 makes the sensor chip 10 thinner. Here, as shown in FIG. 1, the differential pressure diaphragm 4 is formed as a square. In addition, the center of the differential pressure diaphragm 4 and the center O of the sensor chip 10 coincide. Namely, the center point of the differential pressure diaphragm 4 is at the intersection point of the diagonal line AB and the diagonal line CD. Furthermore, the differential pressure diaphragm 4 is disposed tilted by 45° with respect to the square sensor chip 10. Accordingly, the diagonal line AB perpendicularly passes through the centers of two opposing sides of the differential pressure diaphragm 4. In addition, the diagonal line CD perpendicularly passes through the centers of the other two opposing sides of the differential pressure diaphragm 4. The diagonal lines of the differential pressure diaphragm 4 are disposed at angles between the diagonal line AB and the diagonal line CD.

Differential pressure gauges 5a-5d are provided to the front surface of the differential pressure diaphragm 4. These four differential pressure gauges 5a-5d are collectively called differential pressure gauges 5. The differential pressure gauges 5 are provided to the end parts of the differential pressure diaphragm 4. Namely, the differential pressure gauges 5 are formed on the perimeter edge parts of the differential pressure diaphragm 4.

The four differential pressure gauges 5 are formed on the sides of the differential pressure diaphragm 4 that are parallel to the diagonal line CD. Namely, the differential pressure gauges 5 are formed only on two opposing sides of the differential pressure diaphragm 4 and are not formed on the remaining two sides. Here, the differential pressure gauges 5a, 5c are formed on the side that is on the corner A side, and the differential pressure gauges 5b, 5d are formed on the side that is on the corner B side. Thus, two differential pressure gauges 5 are formed on each of the two opposing sides. Accordingly, the differential pressure gauge 5c is formed in the vicinity of the differential pressure gauge 5a. In addition, the differential pressure gauge 5d is formed in the vicinity of the differential pressure gauge 5b. In other words, the differential pressure gauge 5a is closer to the differential pressure gauge 5c than it is to the differential pressure gauges 5b, 5d, and the differential pressure gauge 5b is closer to the differential pressure gauge 5d than it is to the differential pressure gauges 5a, 5c. Accordingly, the differential pressure gauges 5a-5d are not equispaced in the perimeter directions.

The differential pressure gauge 5a and the differential pressure gauge 5b are disposed such that they oppose one another and sandwich the center O. The differential pressure gauge 5a and the differential pressure gauge 5b are disposed such that they are point symmetric with respect to the center O. In addition, the differential pressure gauge 5c and the differential pressure gauge 5d are disposed such that they oppose one another and sandwich the center O. The differential pressure gauge 5c and the differential pressure gauge 5d are disposed such that they are point symmetric with respect to the center O. The differential pressure gauge 5a and the differential pressure gauge 5d are disposed at positions at which they oppose one another and sandwich the differential pressure diaphragm 4. The differential pressure gauge 5b and the differential pressure gauge 5c are disposed at positions at which they oppose one another and sandwich the differential pressure diaphragm 4. The longitudinal directions of the differential pressure gauges 5a, 5b are perpendicular to the diagonal line CD. Namely, each of the differential pressure gauges 5a, 5b is perpendicular to the one side of the differential pressure diaphragm 4 at which it is formed. Moreover, the longitudinal directions of each of the differential pressure gauges 5c, 5d are parallel to the diagonal line CD. Namely, each of the differential pressure gauges 5c, 5d is parallel to the one side of the differential pressure diaphragm 4 at which it is formed. Accordingly, they are provided in directions that are orthogonal to a static pressure gauge 15a and a static pressure gauge 15c, which are proximately disposed. In addition, they are provided in directions that are orthogonal to a static pressure gauge 15b and a static pressure gauge 15d, which are proximately disposed.

The differential pressure gauges 5 are strain gauges, each of which produces the piezoresistive effect. Accordingly, when the sensor chip 10 warps, the resistance of each of the differential pressure gauges 5a-5d changes. Furthermore, wiring (not shown) that connects each of the differential pressure gauges 5a-5d is formed on an upper surface of the sensor chip 10. For example, wiring is formed at both ends of each of the differential pressure gauges 5a-5d. The wiring connects the four differential pressure gauges 5 to a bridge circuit. The pressure differential of spaces separated by the differential pressure diaphragm 4 deforms the differential pressure diaphragm 4. The resistance of each of the differential pressure gauges 5 varies with the amount of deformation of the differential pressure diaphragm 4. Detecting these changes in resistance makes it possible to measure the pressure. As shown in FIG. 2 and FIG. 3, the differential pressure gauges 5 are formed on the front surface of the sensor chip 10. Furthermore, wiring (not shown) is connected to both ends of each of the differential pressure gauges 5a-5d in the longitudinal directions. For example, each of the differential pressure gauges 5a, 5b is formed in the crystallographic plane orientation (100) of the sensor chip 10 such that it is parallel to the crystallographic axial directions <110> where the piezoresistive coefficient is maximal.

Furthermore, two static pressure diaphragms 17c, 17d are provided to the sensor chip 10. These two static pressure diaphragms 17c, 17d are collectively called static pressure diaphragms 17. As shown in FIG. 3, the static pressure diaphragms 17 are formed by eliminating the first semiconductor layer 1. Namely, the formation of the static pressure diaphragms 17 makes the sensor chip 10 thinner. The static pressure diaphragms 17 are disposed in outer perimeter parts of the differential pressure diaphragm 4. Namely, the static pressure diaphragms 17 are disposed on the outer sides of the differential pressure diaphragm 4. The two static pressure diaphragms 17c, 17d are disposed such that they are point symmetric with respect to the center O.

Accordingly, the static pressure diaphragm 17c and the static pressure diaphragm 17d are disposed such that they oppose one another and sandwich the differential pressure diaphragm 4. The static pressure diaphragm 17c and the static pressure diaphragm 17d are disposed on the diagonal line CD. Furthermore, the distance from the center O to the static pressure diaphragm 17c and the distance from the center O to the static pressure diaphragm 17d are the same. The static pressure diaphragm 17c and the static pressure diaphragm 17d have the same size and shape. The static pressure diaphragms 17 are smaller than the differential pressure diaphragm 4.

The static pressure diaphragm 17c is disposed between the center O and the corner C. Namely, the static pressure diaphragm 17c is disposed between the corner C and the one side of the differential pressure diaphragm 4 on the corner C side. Here, the one side of the differential pressure diaphragm 4 on the corner C side is a side at which the differential pressure gauges 5 are not formed. In addition, the static pressure diaphragm 17d is disposed between the center O and the corner D. Namely, the static pressure diaphragm 17d is disposed between the corner D and the one side of the differential pressure diaphragm 4 on the corner D side. The one side of the differential pressure diaphragm 4 on the corner D side is a side at which the differential pressure gauges 5 are not formed and is the side that opposes the one side of the differential pressure diaphragm 4 on the corner C side.

Each of the static pressure diaphragms 17 is formed as an oblong. Accordingly, the long sides and the short sides of each of the static pressure diaphragms 17 are orthogonal. Namely, each of the static pressure diaphragms 17 has longitudinal directions and latitudinal directions. Here, the directions that extend from the center of the sensor chip 10 toward the outer side are the radial directions (i.e., the r directions). Namely, the directions that extend from the center point of the sensor chip 10 toward the ends of the sensor chip 10 are the radial directions. Because the centers of the sensor chip 10 and the differential pressure diaphragm 4 coincide, these radial directions are the radial directions with respect to the center of the differential pressure diaphragm 4. Furthermore, the directions that are orthogonal to the radial directions are the perimeter directions (i.e., the θ directions). The perimeter directions correspond to the tangential directions of a circle whose center is the center of the sensor chip 10. The short sides of each of the static pressure diaphragms 17 are parallel to the radial directions.

The short sides of each of the static pressure diaphragms 17c, 17d are parallel to the diagonal line CD. Thus, the latitudinal directions of the two opposing static pressure diaphragms 17c, 17d are parallel. In addition, the longitudinal directions and the perimeter directions of the static pressure diaphragms 17 that are disposed on the diagonal line CD are parallel. The static pressure gauges 15a, 15c are formed in the static pressure diaphragm 17c. The static pressure gauges 15b, 15d are formed in the static pressure diaphragm 17d.

The static pressure gauges 15a, 15b are formed in the end parts of the static pressure diaphragms 17. Namely, the static pressure gauge 15a overlaps a perimeter edge of the static pressure diaphragm 17c. The static pressure gauge 15a is formed on the side of the static pressure diaphragm 17c that is on the corner C side. The static pressure gauge 15a is formed on and along a long side of the static pressure diaphragm 17c. The static pressure gauge 15b overlaps a perimeter edge of the static pressure diaphragm 17d. The static pressure gauge 15b is formed on the side of the static pressure diaphragm 17d that is on the corner D side. The static pressure gauge 15b is formed on and along a long side of the static pressure diaphragm 17d.

The static pressure gauge 15a and the static pressure gauge 15b are disposed such that they oppose one another and sandwich the differential pressure diaphragm 4. The static pressure gauge 15a and the static pressure gauge 15b are disposed symmetrically with respect to the center O. The distance from the center O of the sensor chip 10 to the static pressure gauge 15a and the distance from the center O of the sensor chip 10 to the static pressure gauge 15b are equal.

Moreover, the static pressure gauges 15c, 15d are formed in the center parts of the static pressure diaphragms 17. Namely, the static pressure gauge 15c is formed on the inner sides of the perimeter edges of the static pressure diaphragm 17c. The static pressure gauge 15d is formed on the inner sides of the perimeter edges of the static pressure diaphragm 17d. Accordingly, the static pressure gauges 15c, 15d are disposed between the static pressure gauge 15a and the static pressure gauge 15b. Namely, in the direction that proceeds from the corner C to the corner D, the static pressure gauge 15a, the static pressure gauge 15c, the static pressure gauge 15d, and the static pressure gauge 15b are disposed, in that order. Furthermore, the differential pressure diaphragm 4 is disposed between the static pressure gauge 15c and the static pressure gauge 15d.

The static pressure gauge 15c and the static pressure gauge 15d are disposed such that they oppose one another and sandwich the differential pressure diaphragm 4. The static pressure gauge 15c and the static pressure gauge 15d are disposed symmetrically with respect to the center O. Accordingly, the distance from the center O of the sensor chip 10 to the static pressure gauge 15c and the distance from the center O of the sensor chip 10 to the static pressure gauge 15d are equal. In addition, the distance from the center O to the static pressure gauge 15a is longer than the distance from the center O to the static pressure gauge 15c. The static pressure gauges 15a, 15c are formed more on the corner C side than on the center O side. The static pressure gauges 15b, 15d are formed more on the corner D side than on the center O side.

Like the differential pressure gauges 5, the static pressure gauges 15a, 15b, 15c, 15d are strain gauges. Accordingly, when the sensor chip 10 warps, the resistance of each of the static pressure gauges 15a, 15b, 15c, 15d changes owing to the piezoresistive effect. The static pressure gauges 15a, 15b, 15c, 15d are connected to a bridge circuit, like the differential pressure gauges 5. Thereby, the static pressure can be measured. Furthermore, as shown in FIG. 3, the static pressure gauges 15a, 15b, 15c, 15d are formed in the front surface of the sensor chip 10. Wiring (not shown) is connected to both ends of each of the static pressure gauges 15a, 15b, 15c, 15d in the longitudinal directions. Furthermore, as in the differential pressure gauges 5, the static pressure gauges 15a, 15b, 15c, 15d are wired to the bridge circuit.

Here, the static pressure diaphragms 17c, 17d are formed on the outer sides of the sides of the differential pressure diaphragm 4 at which the differential pressure gauges 5 are not formed. Namely, because the differential pressure gauges 5 are not formed on the side of the differential pressure diaphragm 4 that is on the corner C side and the side of the differential pressure diaphragm 4 that is on the corner D side, the static pressure diaphragms 17c, 17d are not formed between the corner A and the differential pressure diaphragm 4 and between the corner B and the differential pressure diaphragm 4. The static pressure diaphragms 17 are formed between the sides of the differential pressure diaphragm 4 (i.e., the sides perpendicular to the diagonal line CD) that are not the two sides of the differential pressure diaphragm 4 at which the differential pressure gauges 5 are formed (i.e., the sides parallel to the diagonal line CD) and the edges of the sensor chip 10.

Thereby, the impact on the differential pressure gauges 5 when static pressure is applied is mitigated. It is possible to secure more distance between the differential pressure gauges 5 and the static pressure diaphragms 17 than is provided in a configuration wherein the differential pressure gauges 5 are disposed on each side of the differential pressure diaphragm 4. Thereby, the differential pressure can be measured more accurately. In addition, more distance between the static pressure gauges 15 and the differential pressure diaphragm 4 can be secured than is provided in a configuration wherein four static pressure diaphragms 17 are provided to the outer perimeter parts of the differential pressure diaphragm 4. Thereby, the impact on the static pressure gauges 15 when differential pressure is applied can be mitigated. Thereby, the static pressure can be measured more accurately. Thus, both the static pressure and the differential pressure can be measured more accurately. The spacing between the differential pressure diaphragm 4 and the static pressure gauges 15a-15d can be enlarged. Consequently, it is possible to reduce the impact of the stress generated by adjacent diaphragms. Namely, it is possible to prevent the impact of crosstalk generated by interference between the static pressure and the differential pressure.

The locations in which the static pressure diaphragms 17 are provided and the locations in which the differential pressure gauges 5 are provided are different. Namely, the differential pressure gauges 5a, 5c are disposed between the center O and the corner A, the differential pressure gauges 5b, 5d are disposed between the center O and the corner B, the static pressure diaphragm 17c is provided between the center O and the corner C, and the static pressure diaphragm 17d is provided between the center O and the corner D. The layout in the perimeter directions is the differential pressure gauge 5c, the differential pressure gauge 5a, the static pressure diaphragm 17d, the differential pressure gauge 5d, the differential pressure gauge 5b, and the static pressure diaphragm 17c, in that order. Furthermore, the differential pressure gauges 5 do not exist between the static pressure diaphragm 17c and the static pressure diaphragm 17d. In other words, the four differential pressure gauges 5a-5d are disposed outside of the region between the static pressure diaphragm 17c and the static pressure diaphragm 17d. The position of the static pressure diaphragm 17c in the perimeter directions lies between the differential pressure gauge 5c and the differential pressure gauge 5b. In addition, the position of the static pressure diaphragm 17d in the perimeter directions lies between the differential pressure gauge 5a and the differential pressure gauge 5d.

The differential pressure gauge 5a, which is disposed in the radial directions, and the differential pressure gauge 5c, which is disposed in the perimeter directions, are formed on one side of the differential pressure diaphragm 4. Namely, the two differential pressure gauges 5a, 5c, which are formed in orthogonal directions, are formed on the same side of the differential pressure diaphragm 4. In addition, on the side that opposes that side, the two differential pressure gauges 5b, 5d, which are formed in orthogonal directions, are formed. The differential pressure gauges 5a, 5b are provided in the radial directions, and the differential pressure gauges 5c, 5d are provided in the perimeter directions. Furthermore, the bridge circuit is formed only on two opposing sides. Furthermore, the static pressure diaphragms 17 are disposed in directions in which the differential pressure gauges 5 are not provided. Namely, the static pressure diaphragms 17 are formed on the outer sides of the sides at which the differential pressure gauges 5 are not formed. FIG. 1 shows a configuration wherein the static pressure diaphragms 17 are not formed on the diagonal line AB. Adopting such a configuration makes it possible to accurately measure both the static pressure and the differential pressure. Namely, it is possible to implement a compact, high performance pressure sensor. Furthermore, in the present embodiment, the differential pressure gauges 5a-5d are formed on the sides of the differential pressure diaphragm 4, but they may be formed at any location as long as it is a location in the vicinity of the end parts of the differential pressure diaphragm 4 at which the maximum stress is generated.

In addition, the sensor chip 10 is bonded to a pedestal 11. The region at which the pedestal 11 and the sensor chip 10 are bonded is designated as a bonded region 13A. In addition, the regions at which the pedestal 11 and the sensor chip 10 are not bonded are designated as nonbonded regions 13. Namely, as shown in FIG. 2, thin walled parts are formed at the end parts of the pedestal 11 and a thick walled part is formed in the center part. The height of the thin walled parts is less than that of the thick walled part. The thick walled part is bonded to the sensor chip 10. Moreover, the pedestal 11 and the sensor chip 10 are not bonded at the thin walled parts. Accordingly, the nonbonded regions 13 are disposed on the outer sides of the bonded region 13A.

Here, the nonbonded regions 13 are formed on the corner A side and on the corner B side. Furthermore, each of the nonbonded regions 13 is triangular. Namely, one of the nonbonded regions 13 is a right isosceles triangle whose vertex is the corner A, and the other nonbonded region 13 is a right isosceles triangle whose vertex is the corner B. The triangular nonbonded regions 13 are disposed such that they oppose one another and sandwich the bonded region 13A. Namely, the two nonbonded regions 13 are formed symmetrically with respect to the diagonal line CD. The bonded region 13A is disposed between the two nonbonded regions 13. A through hole 18 is formed in the center of the bonded region 13A. The through hole 18, which is provided to the pedestal 11, communicates with the differential pressure diaphragm 4. Thereby, the through hole 18 constitutes an introduction port and is capable of introducing gas as far as the differential pressure diaphragm 4. Furthermore, the bonded region 13A is hexagonal. The boundary lines between the bonded region 13A and the nonbonded regions 13 are parallel to the diagonal line CD.

Thus, the direction in which the nonbonded regions 13 are provided is different from the direction in which the static pressure diaphragms 17 are provided. Namely, one of the nonbonded regions 13 is provided in the region between the center O and the corner A and the other of the nonbonded regions 13 is provided in the region between the center O and the corner B; furthermore, one of the static pressure diaphragms 17 is provided in the region between the center O and the corner C and the other of the static pressure diaphragms 17 is provided in the region between the center O and the corner D. In other words, the configuration is such that, in the direction of the diagonal line CD, the nonbonded regions 13 are not provided on the outer and inner sides of the static pressure diaphragms 17. The nonbonded regions 13 are formed between the sides of the differential pressure diaphragm 4 that are not the two sides where the differential pressure gauges 5 are formed and the ends of the sensor chip 10.

The dimensions of the nonbonded regions 13 and the bonded region 13A are adjusted such that the stress generated in the direction of the diagonal line AB and the stress generated in the direction of the diagonal line CD perpendicular thereto are equal. Adopting such a configuration makes it possible to improve the temperature characteristics. Namely, as disclosed in Japanese Patent No. 3359493, it is possible to minimize the zero shift produced by the temperature and dispersion thereof and thereby to provide satisfactory temperature characteristics. Furthermore, it is possible to adopt a configuration wherein the static pressure diaphragms 17 are not disposed at the periphery of the nonbonded regions 13. Thereby, spaces that form the nonbonded regions 13 can be secured. This makes it possible to implement a compact, high performance pressure sensor.

Next, a method of fabricating the pressure sensor according to the present embodiment will be explained. First, a process of fabricating the sensor chip 10 wherein the pressure sensor is used will be explained, referencing FIG. 4 and FIG. 5. FIG. 4 contains views, each of which shows the configuration of the sensor chip 10 viewed from above, that describe the method of fabricating the sensor chip 10. FIG. 5 contains process cross sectional views, each of which shows a cross sectional view taken along the V-V line of FIG. 4, that show the process of fabricating the sensor chip 10.

First, the SOI wafer that comprises the first semiconductor layer 1, the insulation layer 2 with a thickness of approximately 0.5 µm, and the second semiconductor layer 3 is prepared. To manufacture the SOI wafer, the SIMOX (Separation by IMplanted OXygen) technology, wherein an Si substrate is implanted with oxygen to form an $SiO_2$ layer, may be used; alternatively, silicon direct bonding (SDB) technology, wherein two Si substrates are bonded together, may be used; in addition, other methods may also be used. Furthermore, the second semiconductor layer 3 may be planarized and made into a thin film. For example, a polishing method called computer controlled polishing (CCP) may be used to polish the second semiconductor layer 3 to a prescribed thickness.

Figure 4A:
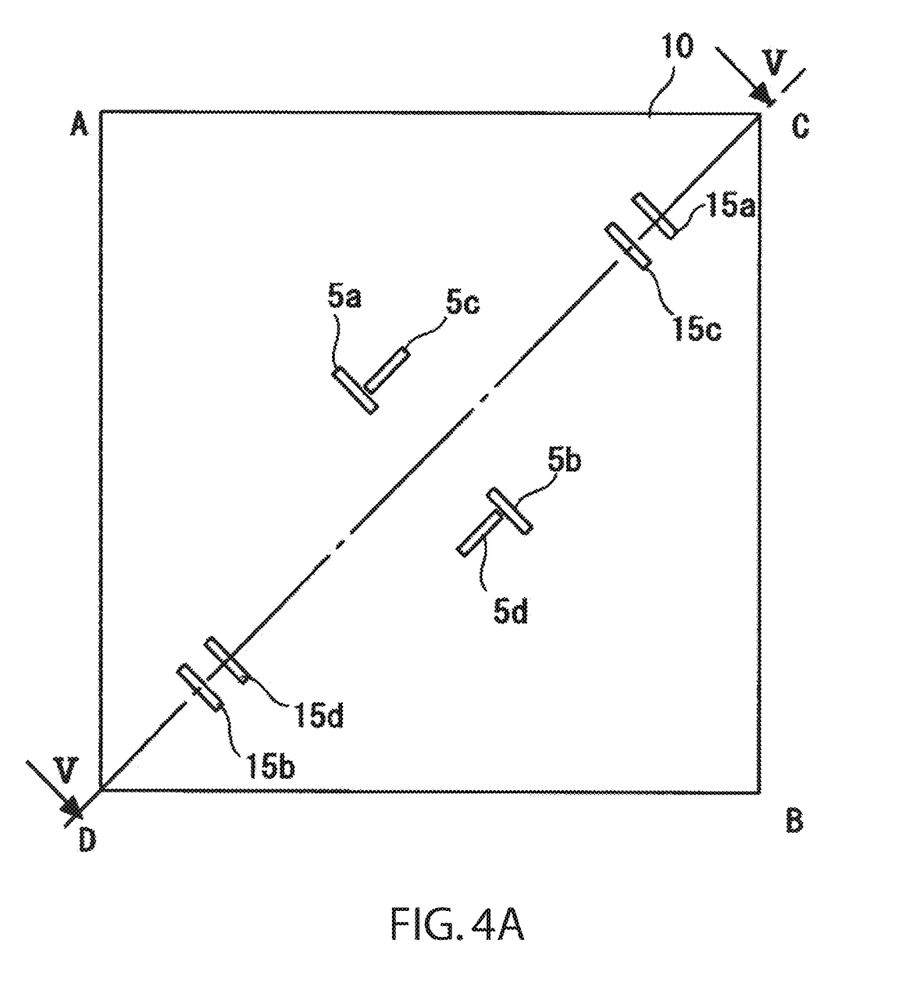
FIG. 4 contains views that show a process of fabricating a sensor chip of the pressure sensor.

Impurity diffusion or an ion implanting method is used to form the static pressure gauges 15a, 15b, 15c, 15d, all of which are made of p-type Si, on the upper surface of the second semiconductor layer 3. Thereby, the configuration shown in FIG. 4(a) and FIG. 5(a) is created. Of course, the differential pressure gauges 5a-5d can be formed in this process as well. As shown in FIG. 1 and the like, each of the gauges is formed at a prescribed position where one of the diaphragms is located. Furthermore, the differential pressure gauges 5a-5d, the static pressure gauges 15a-15d may be formed after the diaphragms are formed using the process described below. Of course, the differential pressure gauges 5 may be given characteristics different from those of the static pressure gauges 15a-15d.

Figure 5A:
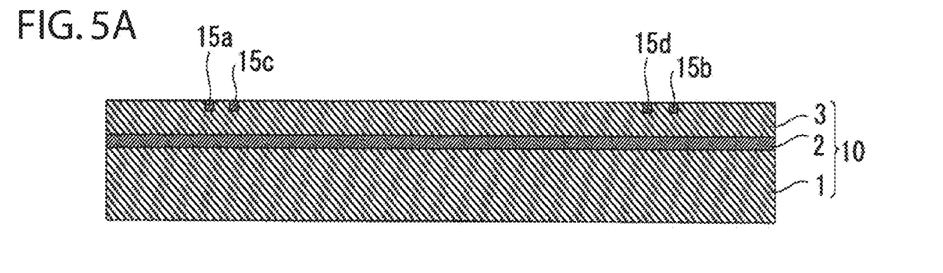
FIG. 5 contains process cross sectional views, each of which is a cross sectional view taken along the V-V line in FIG. 4, that show the process of fabricating the sensor chip of the pressure sensor.
Figure 5B:
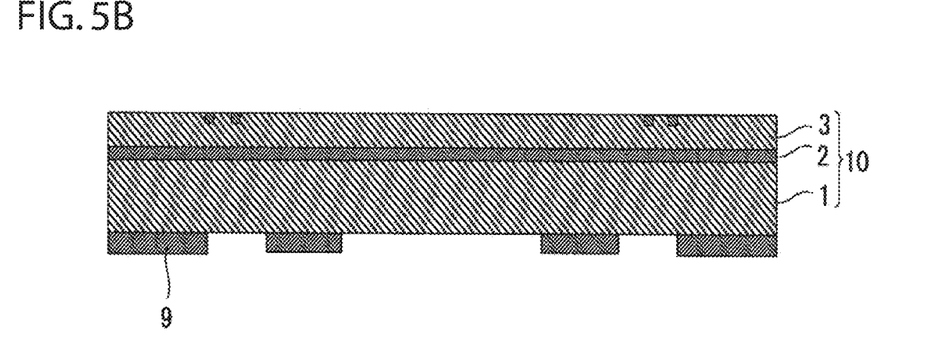

In the lower surface of the SOI wafer formed in this manner, a resist 9 is formed. The well known photolithographic process is used to form a pattern in the resist 9 on the first semiconductor layer 1. Namely, the pattern in the resist 9 is formed by applying a photosensitive resin layer, exposing it, and developing it. The resist 9 has openings at portions corresponding to pressure sensitive regions (i.e., regions wherein the diaphragms are formed). Namely, the first semiconductor layer 1 is exposed at the portions wherein the diaphragms are formed. Thereby, the configuration shown in FIG. 5(b) is created.

Figure 5C:
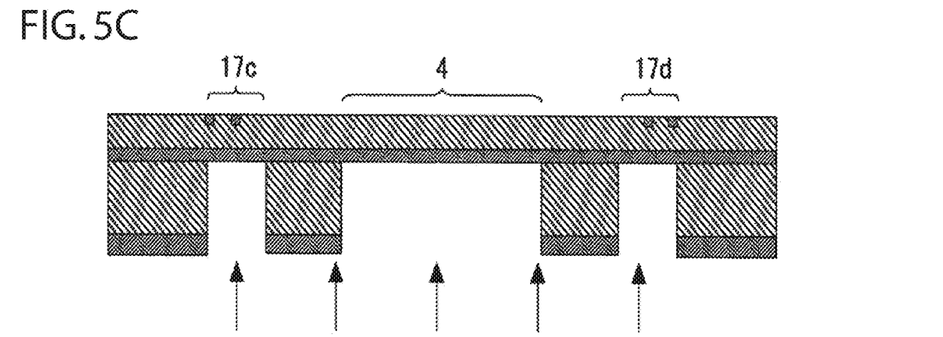

Furthermore, the first semiconductor layer 1 is etched using the resist 9 as a mask. Thereby, the configuration shown in FIG. 5(c) is created. For example, the first semiconductor layer 1 can be etched using dry etching such as ICP etching, which is well known. Of course, the first semiconductor layer 1 may be etched by wet etching, wherein a solution such as KOH or TMAH is used. Etching the first semiconductor layer 1 forms the differential pressure diaphragm 4 and the static pressure diaphragms 17. Here, the insulation layer 2 functions as an etching stop. Accordingly, the insulation layer 2 is exposed through the openings in the resist 9.

Figure 4B:
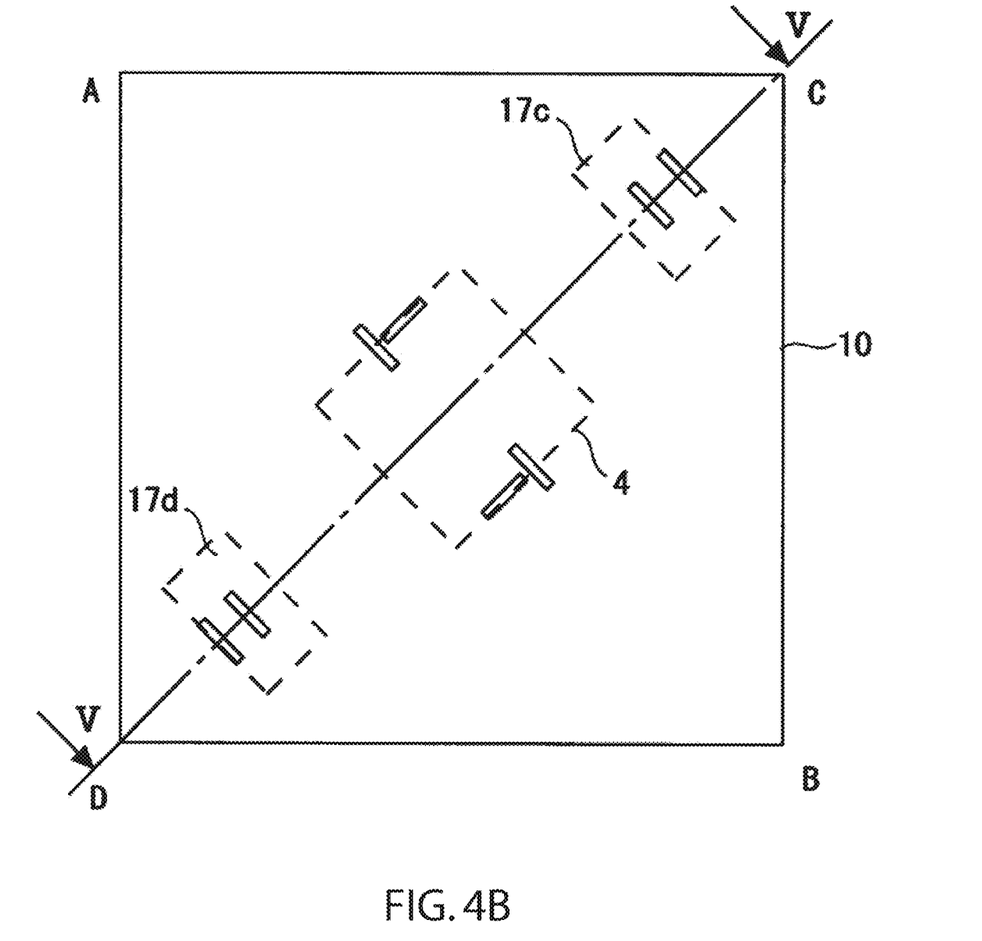
Figure 5D:
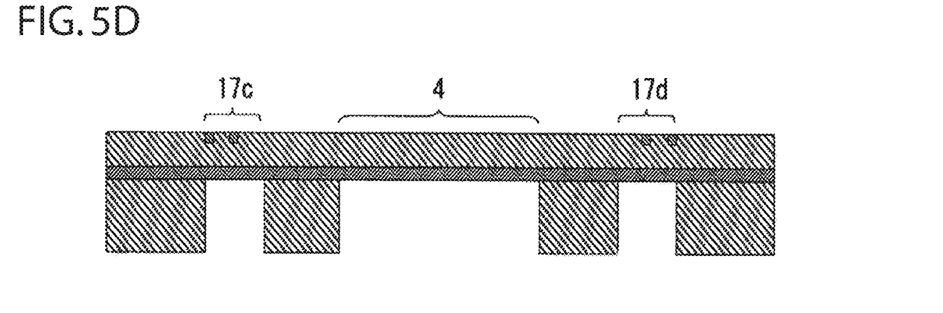

Furthermore, stripping the resist 9 creates the configuration shown in FIG. 4(b) and FIG. 5(d). Subsequently, wiring (not shown) for obtaining electrical connections among the static pressure gauges 15a-15d and the differential pressure gauges 5 is formed. Thereby, the bridge circuit is formed and the sensor chip 10 is completed. Furthermore, the process that forms the wiring may be performed prior to the stage shown in FIG. 5(d). For example, the wiring may be formed prior to the stage shown in FIG. 5(a), or between the stages shown in FIG. 5(a) and FIG. 5(c). In addition, as described above, the static pressure gauges 15a-15d and the differential pressure gauges 5 may be formed after the stage shown in FIG. 5(d), or between the stages shown in FIG. 5(a) and FIG. 5(d). In other words, the process of forming the wiring and the order in which the strain gauges are formed are not particularly limited.

In addition, the differential pressure diaphragm 4 and the static pressure diaphragms 17 may undergo the etching process separately. For example, the differential pressure diaphragm 4 and the static pressure diaphragms 17 may be etched using two different types of resist patterns. Namely, etching may be performed after the resist pattern for providing the differential pressure diaphragm 4 is formed. After the differential pressure diaphragm 4 is formed, the resist is stripped. Subsequently, the resist pattern for providing the static pressure diaphragms 17 is formed. Etching is performed using this resist pattern as a mask, and thereby the static pressure diaphragms 17 are formed. Thus, providing the differential pressure diaphragm 4 and the static pressure diaphragms 17 using different etching processes makes it possible to form the differential pressure diaphragm 4 and the static pressure diaphragms 17 with different thicknesses. Of course, the differential pressure diaphragm 4 may be formed after the static pressure diaphragms 17 are formed.

Next, a process of fabricating the pedestal 11 will be explained, referencing FIG. 6 and FIG. 7. FIG. 6 contains views, each of which shows a configuration of the pedestal 11 viewed from above, that describe a method of fabricating the pedestal 11. FIG. 7 contains process cross sectional views, each of which shows the configuration of the pedestal 11 in a cross section taken along the VII-VII line in FIG. 6, that describe the process of fabricating the pedestal 11.

Figure 6A:
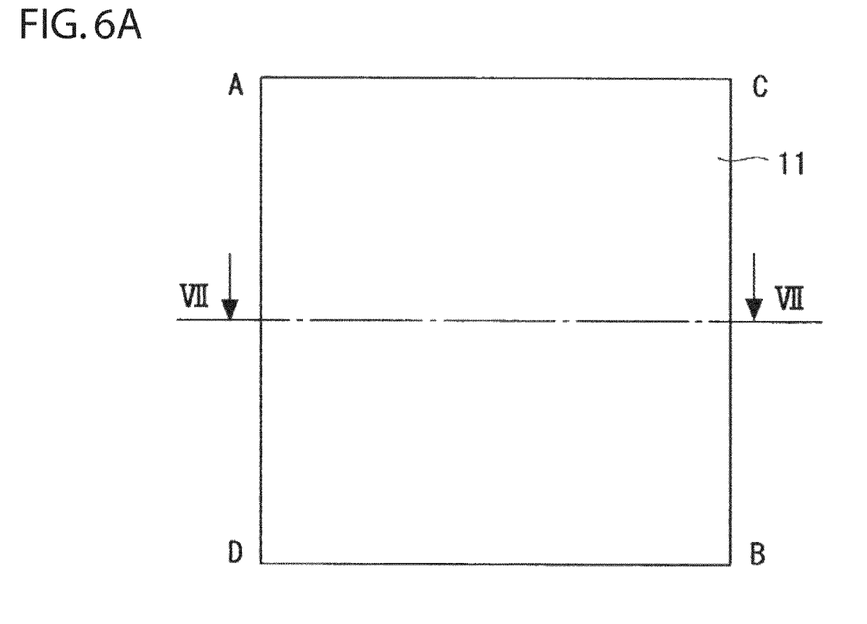
FIG. 6 contains views that show a process of fabricating a pedestal of the pressure sensor.
Figure 6B:
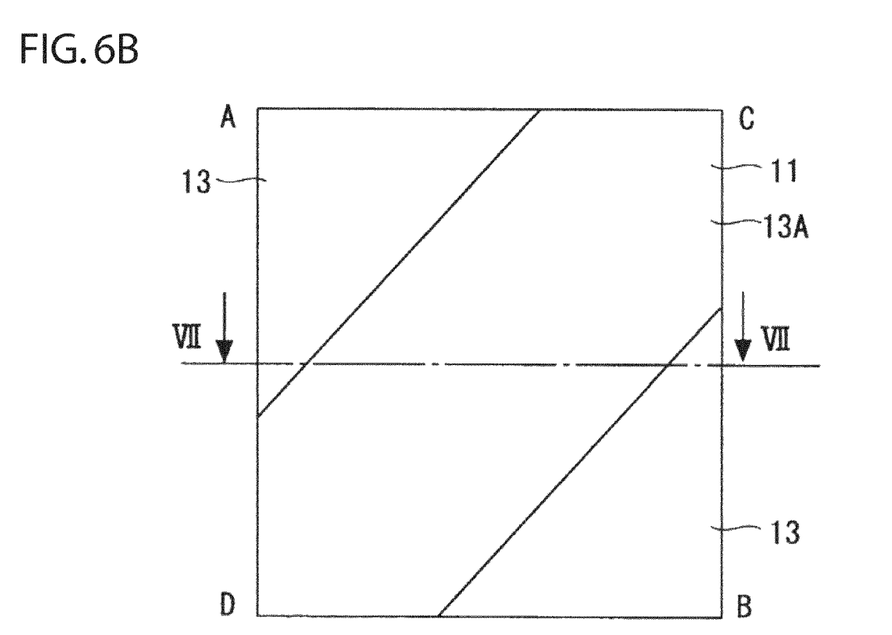
Figure 7A:
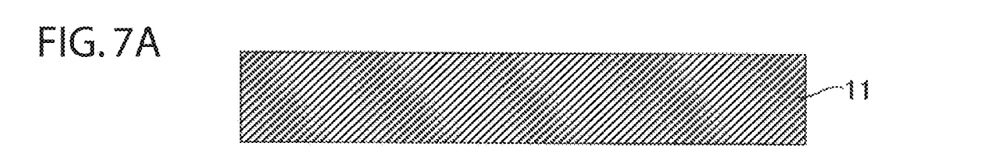
FIG. 7 contains process cross sectional views, each of which is taken along the VII-VII line in FIG. 6, that show the process of fabricating the pedestal of the pressure sensor.
Figure 7B:
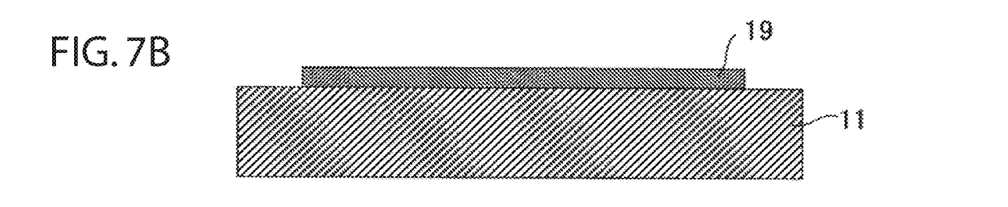

First, as shown in FIG. 6(a) and FIG. 7(a), a substrate that will constitute the pedestal 11 is prepared. A flat substrate, such as one made of Pyrex® glass or a ceramic, is used as the substrate. Furthermore, a resist 19, which constitutes a mask, is formed on the pedestal 11. Thereby, the configuration shown in FIG. 7(b) is created. The resist 19 is patterned using well known exposure and developing processes. The resist 19 is stripped at portions that will become the nonbonded regions 13. Namely, the portions of the pedestal 11 that will become the nonbonded regions 13 are exposed and the portions of the pedestal 11 that will become the bonded region 13A are covered by the resist 19.

Figure 7C:
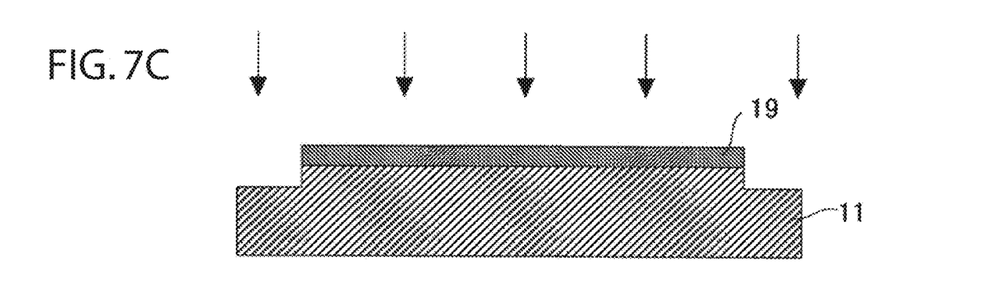
Figure 7D:
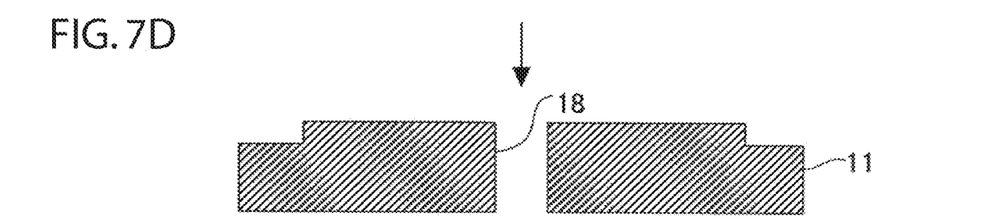
Figure 7E:
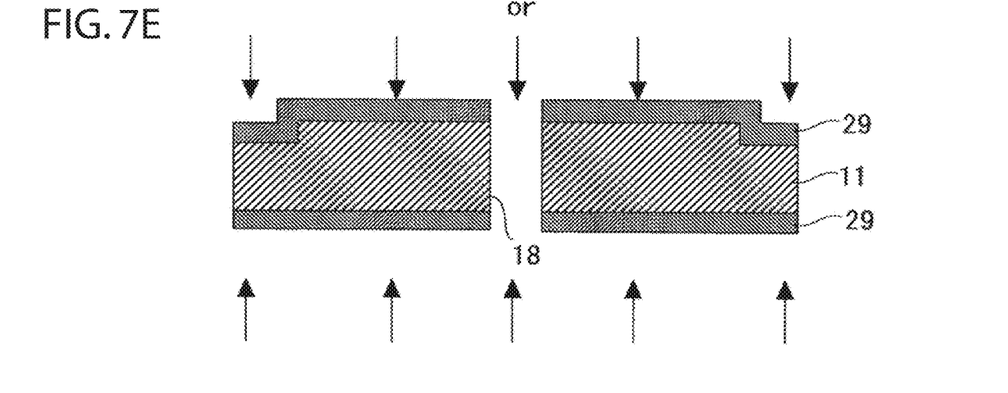

Furthermore, when etching is performed using the resist 19 as a mask, the configuration shown in FIG. 6(b) and FIG. 7(c) is created. A protruding part is formed in the center part of the pedestal 11, and recessed parts are formed on the outer perimeter parts. Namely, the pedestal 11 becomes thinner in parts; furthermore, a thick walled part and thin walled parts are formed in the pedestal 11. The thin walled parts are thinner than the thick walled part. The thin walled parts are formed in the nonbonded regions 13. Here, the thin walled parts are formed in the pedestal 11 by wet etching, wherein HF and the like is used. Alternatively, the thin walled parts may be formed by sandblasting.

Furthermore, the resist 19 is stripped and the through hole 18 is formed. Namely, the circular through hole 18 is formed in the center of the pedestal 11. Thereby, the configuration shown in FIG. 6(c) is created. As shown in the upper side in FIG. 7(d), the through hole 18 is formed by, for example, drilling. Alternatively, as shown in the lower side in FIG. 7(d), it may be formed by sandblasting on both sides. Furthermore, if formed by sandblasting on both sides, then a mask 29 must be formed on both surfaces of the pedestal 11. In so doing, the pedestal 11 is completed.

Furthermore, the sensor chip 10 and the pedestal 11 are bonded to one another. For example, the pedestal 11 is bonded to the first semiconductor layer 1 of the sensor chip 10 by anodic bonding. The through hole 18 that reaches the differential pressure diaphragm 4 is formed in the center of the pedestal 11. The through hole 18 communicates with the differential pressure diaphragm 4. In addition, the nonbonded regions 13 are formed in the vicinities of the corner A and the corner B. The pressure sensor fabricated in this way is compact and has high performance.

Furthermore, in the above explanation, both the sensor chip 10 and the differential pressure diaphragm 4 are squares that are tilted 45° with respect to one another, but their shapes are not limited to a square. For example, the sensor chip 10 and the differential pressure diaphragm 4 may be formed in the shape of a polygon. Furthermore, in this case, the configuration is such that the differential pressure diaphragm 4 is tilted with respect to the sensor chip 10. The differential pressure gauges 5a, 5c are disposed on one side of the differential pressure diaphragm 4, and the differential pressure gauges 5b, 5d are formed on the one side that opposes that one side. Thereby, it is easy to implement a pressure sensor with improved temperature characteristics and reduced crosstalk. If the sensor chip 10 and the differential pressure diaphragm 4 are regular polygons, the tilt angle is determined in accordance with their number of corners. Alternatively, the sensor chip 10 and the differential pressure diaphragm 4 may be circular. In such a case, the differential pressure gauge 5a is disposed in the vicinity of the differential pressure gauge 5c and the differential pressure gauge 5b is disposed in the vicinity of the differential pressure gauge 5d. In so doing, it is possible to easily implement a pressure sensor with reduced crosstalk.

In addition, the above text explained a case wherein each of the static pressure diaphragms 17 has an oblong shape, but the shape of each of the static pressure diaphragms 17 is not limited to an oblong. For example, the static pressure diaphragms 17 may have an elliptical shape or the like. In other words, the static pressure diaphragm 17 may be of any shape as long as it has longitudinal directions and latitudinal directions. Furthermore, it should be disposed such that the latitudinal directions orthogonal to the longitudinal directions are in the radial directions. The longitudinal directions of each of the static pressure gauges 15a-15d are disposed in the longitudinal directions of the static pressure diaphragm 17. Namely, the longitudinal directions of each of the static pressure gauges 15a-15d are disposed in the perimeter directions. In addition, although the static pressure gauges 15a, 15b are formed at the end parts of the static pressure diaphragms 17 on the substrate end sides, they may be formed at the end parts on the substrate center side. Furthermore, although the static pressure gauges 15a-15d are formed on sides of the static pressure diaphragms 17, they may be formed in the vicinities of the end parts of the static pressure diaphragms 17 at locations where the maximum stress is generated.

Figure 8A:
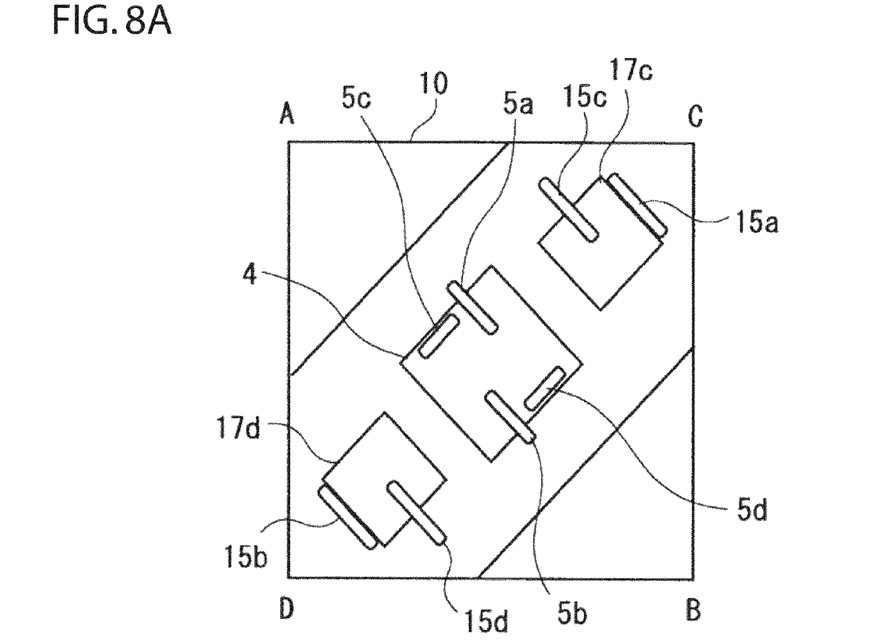
FIG. 8 contains top views that show the configuration of the pressure sensor according to another embodiment.
Figure 8B:
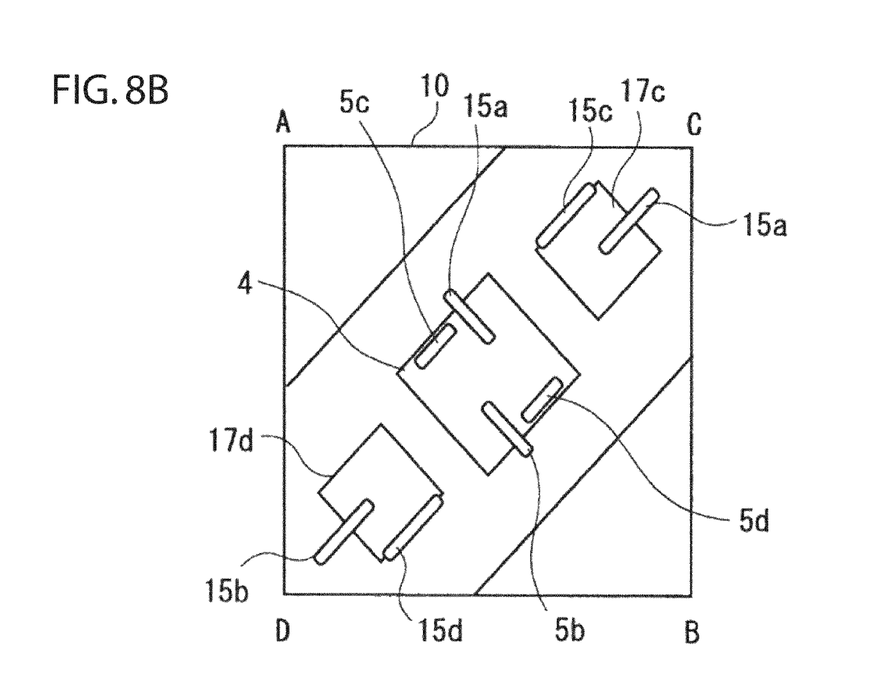
Figure 8C:
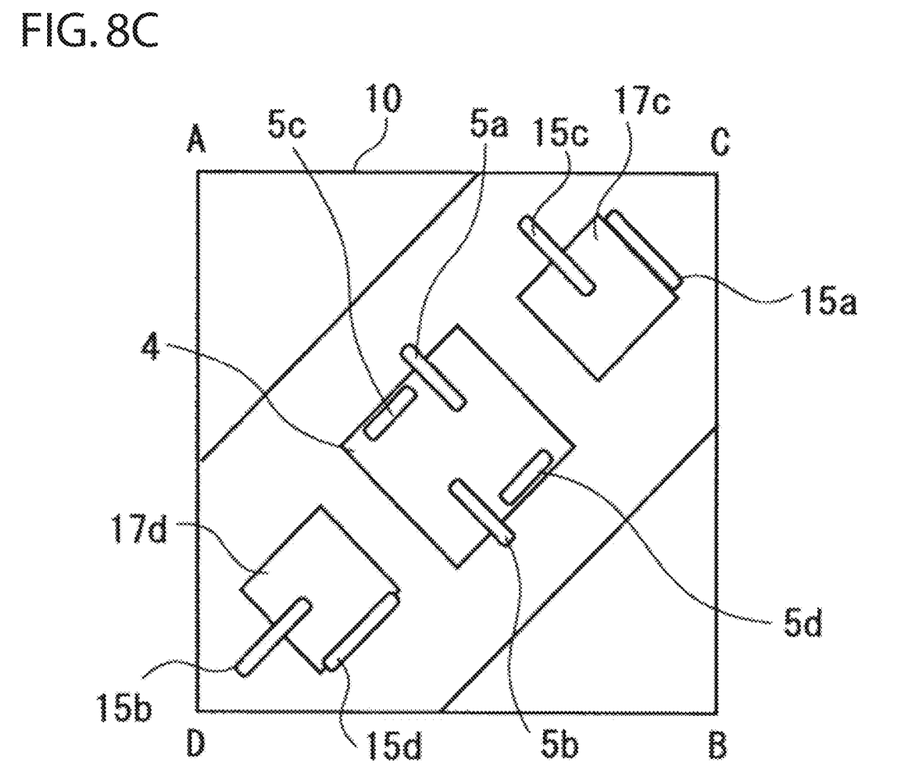

The pressure sensor according to the present embodiment will now be explained, referencing FIG. 8. FIG. 8 contains top views, each of which shows the configuration of the sensor chip 10 wherein the pressure sensor is used. In the present embodiment, the layout of the static pressure gauges 15a-15d is different from that in the first embodiment. In addition, a configuration is adopted wherein the static pressure diaphragms 17c, 17d are square. Aspects of the configuration other than these layout points are the same as those in the above embodiment, and explanations thereof are therefore omitted. Furthermore, each of the static pressure gauges 15a-15d is disposed differently in FIG. 8(a) through FIG. 8(c).

First, the configuration of the sensor chip 10 shown in FIG. 8(a) will be explained. The two square static pressure diaphragms 17c, 17d are formed. In FIG. 8(a), the four static pressure gauges 15a-15d are parallel to the diagonal line AB. In the present embodiment, the four static pressure gauges 15a-15d are disposed at end parts of the static pressure diaphragms 17c, 17d. Furthermore, the static pressure gauges 15a, 15c are disposed at two adjacent sides of the static pressure diaphragm 17c, and the static pressure gauges 15b, 15d are disposed at two adjacent sides of the static pressure diaphragm 17d. Accordingly, the static pressure gauges 15c, 15d are disposed on sides of the static pressure diaphragms 17c, 17d that are parallel to the diagonal line CD. Accordingly, the static pressure gauge 15c is perpendicular to the one side of the static pressure diaphragm 17c at which it is disposed. Likewise, the static pressure gauge 15d is perpendicular to the one side of the static pressure diaphragm 17d at which it is disposed.

Moreover, the static pressure gauges 15a, 15b are disposed on sides of the static pressure diaphragms 17c, 17d that are parallel to the diagonal line AB. Here, the static pressure gauge 15a is disposed on the one side of the static pressure diaphragm 17c that is on the corner C side. The static pressure gauge 15a is parallel to the one side of the static pressure diaphragm 17c at which it is disposed. Likewise, the static pressure gauge 15b is disposed on the one side of the static pressure diaphragm 17d that is on the corner D side. The static pressure gauge 15b is parallel to the one side of the static pressure diaphragm 17d at which it is disposed.

Thus, of the two static pressure gauges 15a, 15c, which are disposed on perimeter edges of the static pressure diaphragm 17c, one is disposed in the radial directions and the other is disposed in the perimeter directions. Likewise, of the two static pressure gauges 15b, 15d, which are disposed on perimeter edges of the static pressure diaphragm 17d, one is disposed in the radial directions and the other is disposed in the perimeter directions. Such a configuration, too, can obtain the same effects as those obtained in the above embodiment.

Next, the configuration of the sensor chip 10 shown in FIG. 8(b) will be explained. In the configuration shown in FIG. 8(b), the directions of the static pressure gauges 15a-15d are different from those in the configuration shown in FIG. 8(a). Other aspects of the configuration are the same as those in the first embodiment and the configuration shown in FIG. 8(a), and explanations thereof are therefore omitted. As shown in FIG. 8(b), the static pressure gauges 15a-15d are parallel to the diagonal line CD. Namely, a configuration is adopted wherein the static pressure gauges 15a-15d shown in FIG. 8(a) are rotated about their centers by 90°. Accordingly, the static pressure gauge 15a is perpendicular to the one side of the static pressure diaphragm 17c at which it is disposed.

Likewise, the static pressure gauge 15b is perpendicular to the one side of the static pressure diaphragm 17d at which it is disposed. Moreover, the static pressure gauge 15c is parallel to the one side of the static pressure diaphragm 17c at which it is disposed. The static pressure gauge 15d is parallel to the one side of the static pressure diaphragm 17d at which it is disposed. In such a configuration, too, it is possible to obtain the same effects as those obtained in the first embodiment.

The configuration of the sensor chip 10 shown in FIG. 8(c) will now be explained. In the configuration shown in FIG. 8(c), the directions of the static pressure gauges 15a-15d are different from those of the configurations shown in FIG. 8(a) and FIG. 8(b). Other aspects of the configuration are the same as those in the above embodiment and the configurations shown in FIG. 8(a) and FIG. 8(b), and explanations thereof are therefore omitted.

As shown in FIG. 8(c), the static pressure gauges 15a, 15c are parallel to the diagonal line AB, and the static pressure gauges 15b, 15d are parallel to the diagonal line CD. Namely, the static pressure gauges 15a, 15c provided to the static pressure diaphragm 17c and the static pressure gauges 15b, 15d provided to the static pressure diaphragm 17d are orthogonal.

Accordingly, the static pressure gauge 15a is parallel to the one side of the static pressure diaphragm 17c at which it is disposed. Likewise, the static pressure gauge 15d is parallel to the one side of the static pressure diaphragm 17d at which it is disposed. Moreover, the static pressure gauge 15c is perpendicular to the one side of the static pressure diaphragm 17c at which it is disposed. The static pressure gauge 15b is perpendicular to the one side of the static pressure diaphragm 17d at which it is disposed.

Thus, in the present embodiment, the static pressure gauges 15a-15d are disposed on two adjacent sides of the static pressure diaphragms 17c, 17d. Furthermore, on one side, the static pressure gauge is perpendicular to that side; furthermore, on the other side, the static pressure gauge is parallel to that side. Of course, a configuration other than those shown in FIG. 8(a) through FIG. 8(c) may be adopted.

What is claimed is:
1. A pressure sensor, comprising:
a substrate;
a differential pressure diaphragm, which is provided to a center part of the substrate;
a first differential pressure gauge, which is provided to a perimeter edge part of the differential pressure diaphragm and is formed in radial directions with respect to the center of the differential pressure diaphragm;
a second differential pressure gauge, which is disposed at a position at which it opposes the first differential pressure gauge and, together with the first differential pressure gauge, sandwiches the differential pressure diaphragm and is formed in a perimeter edge part of the differential pressure diaphragm in perimeter directions, which are perpendicular to the radial directions;
a third differential pressure gauge, which is provided to the perimeter edge part of the differential pressure diaphragm in the vicinity of the first differential pressure gauge and is provided in the perimeter directions;
a fourth differential pressure gauge, which is disposed at a position at which it opposes the third differential pressure gauge and, together with the third differential pressure gauge, sandwiches the differential pressure diaphragm and is formed in the radial directions in the perimeter edge part of the differential pressure diaphragm;

a first static pressure diaphragm, which is provided on an outer side of the differential pressure diaphragm and is disposed at a position that lies in the perimeter directions between the third differential pressure gauge and the fourth differential pressure gauge; and a second static pressure diaphragm, which is provided on an outer side of the differential pressure diaphragm and is disposed at a position at which it opposes the first static pressure diaphragm and, together with the first static pressure diaphragm, sandwiches the differential pressure diaphragm.

2. A pressure sensor according to claim 1, further comprising:

a pedestal, which is bonded to the substrate;

wherein, nonbonded regions, wherein the pedestal and the substrate are not bonded, are formed between the opposing two sides of the differential pressure diaphragm at which the differential pressure gauges are provided and ends of the substrate.

3. A pressure sensor according to claim 2, wherein the first and second static pressure diaphragms have shapes such that the edges disposed in the radial directions are shorter than the edges disposed in the perimeter directions; and the static pressure gauges formed such that they oppose and sandwich the differential pressure diaphragm are provided to the center parts of the first and second static pressure diaphragms and the end parts of the first and second static pressure diaphragms that are disposed in the perimeter directions.

4. A pressure sensor according to claim 3, wherein the first and second static pressure diaphragms are oblong.

5. A pressure sensor according to claim 2, wherein the first and second static pressure diaphragms are square; and the static pressure gauges, which are formed such that they line up with the directions in which each of the static pressure diaphragms are arrayed, are provided to two adjacent end parts of the first and second static pressure diaphragms.

* * * * *